(12) United States Patent
Oliver et al.

(10) Patent No.: US 7,795,599 B2
(45) Date of Patent: Sep. 14, 2010

(54) RADIOACTIVITY MONITORING APPARATUS AND METHOD

(75) Inventors: Martin John Oliver, Poole (GB); Matthew Charles Shire-Jones, Poole (GB)

(73) Assignee: Laboratory Impex Systems Limited, Poole, Dorset, England (GB)

( * ) Notice: Subject to any disclaimer, the term of this patent is extended or adjusted under 35 U.S.C. 154(b) by 304 days.

(21) Appl. No.: 11/482,546

(22) Filed: Jul. 6, 2006

(65) Prior Publication Data

US 2009/0095920 A1    Apr. 16, 2009

(30) Foreign Application Priority Data

Jul. 8, 2005    (GB)    ................................ 0514128.8

(51) Int. Cl.
    *G01T 1/04*    (2006.01)
(52) U.S. Cl. .................. 250/473.1; 250/472.1
(58) Field of Classification Search ............ 250/339.04, 250/370.06, 281, 282, 283, 286, 288, 423 R
    See application file for complete search history.

(56) References Cited

U.S. PATENT DOCUMENTS

| 5,124,936 | A |  | 6/1992 | Pelletier et al. |  |
| 5,128,539 | A | * | 7/1992 | Rodgers et al. | 250/255 |
| 5,235,190 | A | * | 8/1993 | Tucker et al. | 250/435 |
| 6,288,400 | B1 |  | 9/2001 | Negro |  |
| 6,326,623 | B1 | * | 12/2001 | Chiba et al. | 250/367 |
| 7,005,632 | B2 | * | 2/2006 | Miller et al. | 250/287 |
| 2005/0051723 | A1 | * | 3/2005 | Neagle et al. | 250/306 |
| 2005/0232387 | A1 | * | 10/2005 | Padgett et al. | 376/194 |

FOREIGN PATENT DOCUMENTS

| GB | 2368185 A | 4/2002 |
| JP | 2000-214265 A | 8/2000 |

OTHER PUBLICATIONS

United Kingdom Examination Report mailed May 30, 2008, issued in corresponding Application No. GB01613541.2, filed Jul. 7, 2006, now Patent No. GB2428291A, issued February 25, 2009.

* cited by examiner

*Primary Examiner*—David P Porta
*Assistant Examiner*—Faye Boosalis
(74) *Attorney, Agent, or Firm*—Christensen O'Connor Johnson Kindness PLLC

(57) ABSTRACT

Apparatus (1) for detecting and/or measuring radioactivity comprising sensor means (5, 6), radiation detector means (4) and signal processing means (10, 11), the sensor means being adapted to provide a measure of one or more characteristics of a medium between the radiation detector means and a source of radioactivity, the arrangement being such that, in use, the signal processing means is configured to compensate for varying degrees of interference from unwanted isotopes by taking into account information received from the sensor means.

10 Claims, 2 Drawing Sheets

RADIOACTIVITY MONITORING APPARATUS AND METHOD

BACKGROUND

The present invention relates to radioactivity monitoring apparatus and seeks to improve radioactivity measurement accuracy and sensitivity of detection in the presence of interfering isotopes.

When, for example, dust is collected on a filter medium and monitored for alpha and/or beta particles from long-lived uranic/transuranic elements, radioactivity measurements are significantly affected by unwanted isotopes, such as naturally occurring radon and thoron progeny. This interference is normally reduced by applying alpha spectrometry but energy degradation in the air gap between filter and detector results in distortion of the spectrum making it difficult to completely separate the isotopes. Attempts have been made to counter these effects by examining the shape of the energy spectrum and estimating the degree of interference but significant errors can still arise when, for example, rapid changes in environmental conditions produce rapid variations in the degree of spectral distortion caused by the air gap.

We have realised that these errors can be significantly reduced by predicting the change in spectral distortion and altering the compensation in order to more completely remove the effect of the interfering isotopes. A priori knowledge of the conditions obtaining in the air gap at the time of measurement can be derived from sensors incorporated into the instrument or information fed to it from external sources.

SUMMARY

According to a first aspect of the invention there is provided apparatus for detecting and/or measuring radioactivity comprising sensor means, radiation detector means and signal processing means, the sensor means being adapted to provide a measure of one or more characteristics of a medium between the radiation detector means and a source of radioactivity, the arrangement being such that, in use, the signal processing means is configured to compensate for varying degrees of interference from unwanted isotopes by taking into account information received from the sensor means.

An embodiment of the invention may be viewed as apparatus for detecting and/or measuring radioactivity where the result is enhanced by compensating for varying degrees of interference from unwanted isotopes due to changes in the characteristics of the medium between the source of radioactivity and the radiation detector and where the changes in these characteristics are determined by means other than by measuring their effect on the resulting energy spectrum.

According to a second aspect of the invention there is provided a method of enhancing the detection and/or measurement of radioactivity by compensating for varying degrees of interference from unwanted isotopes due to changes in one or more characteristics of a medium between a source of radioactivity and a radiation detector means wherein information from sensor means relates to one or more characteristics of the medium, and said information is taken into account to achieve compensation.

BRIEF DESCRIPTION OF THE DRAWINGS

Various embodiments of the invention comprising a continuous air monitor will now be described, by way of example only, with reference to the accompanying drawings in which.

DETAILED DESCRIPTION

Figure 1:
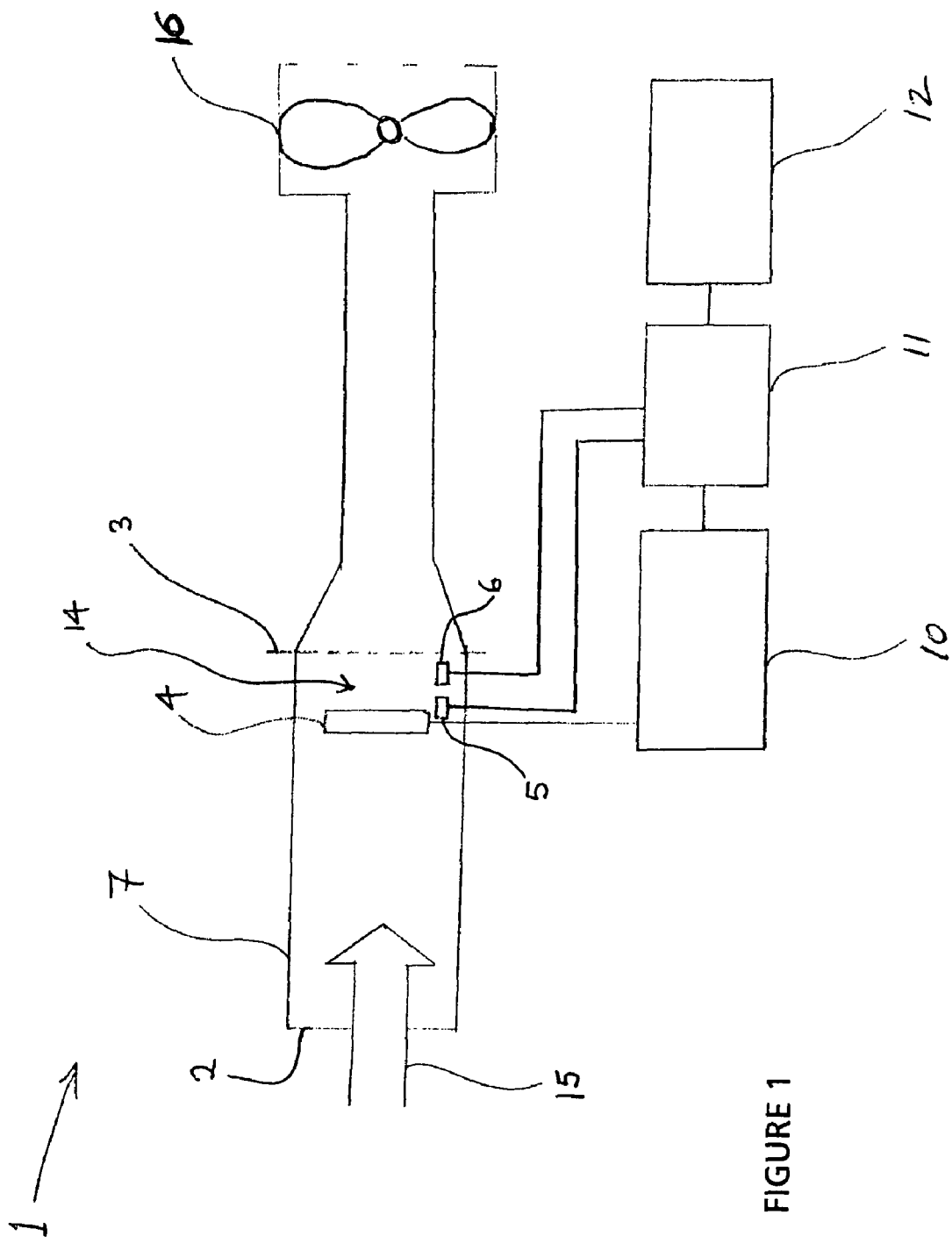
FIG. 1 is a schematic representation of a continuous air monitor.

With reference initially to FIG. 1 a continuous air monitor 1 comprises an air inlet 2 of a conduit 7, an air filter 3, a radiation detector 4, a temperature sensor 5 and an air pressure sensor 6. The monitor 1 further comprises processing electronics components 10 and 11, and alarm means 12. Specifically the processing electronics components have the following functions. The component 10 amplifies the signal from the radiation detector 4. The component 11 receives signals from the sensors, analyses the energy spectrum, separates isotopes of interest from interfering isotopes, such as radon and thoron progeny, calculates the activity level/s of the isotope/s of interest, and compares the calculated levels with stored alarm threshold levels. The alarm means 12 is adapted to issue an audible and/or visible alarm signal.

The monitor 1 further comprises suction means 16 which is adapted to draw a flow of air 15 through the conduit 7.

Figure 2:
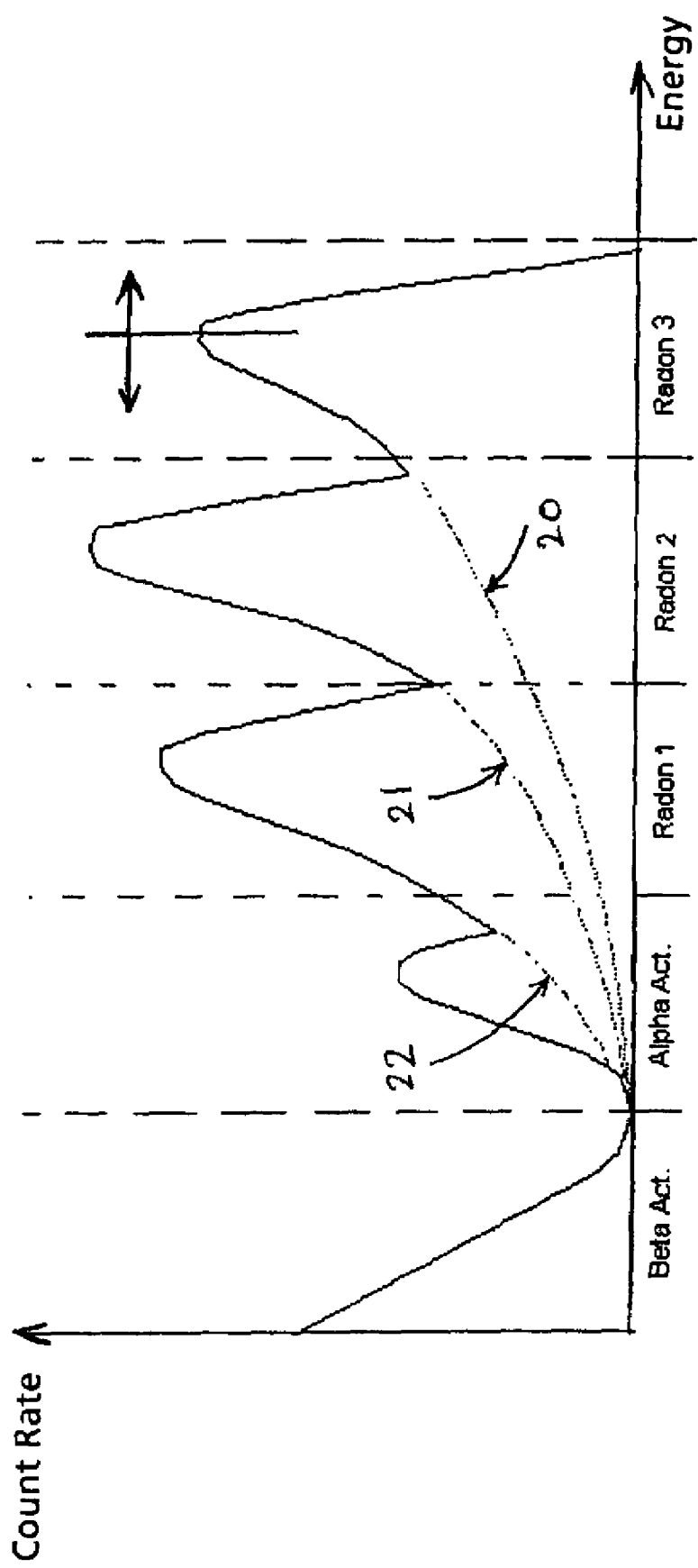
FIG. 2 is a schematic representation of a radioactivity energy spectrum.

With reference now to FIG. 2 there is shown a typical radioactivity energy spectrum, in which energy is plotted against count rate. As is well known the various peaks correspond to different radioactive isotopes. Peaks are identified as Beta activity, Alpha activity, and Radon 1, Radon 2 and Radon 3. The Alpha activity peak could result from plutonium or other long lived radio isotopes, for example, and it is these which the monitor is designed to detect and the Radon peaks result from Thoron and Radon activity. As can be seen from the graph the energy spread of each of the Radon peaks enters into the Alpha activity band (as is shown by the broken curve lines 20, 21, 22 of each of the Radon peaks). It is this 'overlap' or 'smearing' in the Alpha activity region which affects the value of the peak of the Alpha activity radiation and which needs to be compensated for.

The pressure, temperature and humidity of the air in the air gap 14 will influence the density of the air in the gap.

As the density of the air varies the Radon peaks change shape and also shift along the energy axis (as shown by the double-headed arrow) to the left or the right depending on whether air density increases or decreases. The degree of those changes will determine their instantaneous influence in the Alpha activity energy region. Prediction of those effects (which is an objective of the present invention) allows more accurate determination of the Alpha activity.

A first implementation of the arrangement shown in FIG. 1 will now be described. In this first implementation the processing component 11 is configured to determine whether each received (amplified) detector pulse is of an amplitude which corresponds to an energy which is within one of the five energy bands shown in FIG. 2. A count is noted for a respective energy band for each pulse which is determined to be within that energy band. Over time the processing equipment 11 is able to determine a count rate for each energy band.

The processing equipment 11 also receives signals from the temperature sensor 5 and the pressure sensor 6. The processing equipment 11 is configured to process those signals to determine the extent of the spectral shift of the background radiation.

As discussed above the extent of the spectral shift will determine the degree of interference from the background radiation in the Alpha activity band. By knowing the general shape of the Radon curves and the extent of energy shift, the extent of interference or overlap of each background peak in the Alpha activity band can be determined. Accordingly the processing component 11 is operative to determine the extent of interference of background Radon in the Alpha activity band and subtract a corresponding proportion of the count rates in each of the three Radon bands, from the count rate in the Alpha activity band so as to achieve a value which is representative of the actual level of long lived isotopes. This methodology may be termed use of compensation coefficients. This level is then compared with a stored threshold level; if it exceeds the threshold level then a signal is issued to the alarm component 12 so as to activate the alarm.

By using the modified spectral information to change the compensation coefficients, it is possible to thereby achieve more effective isotope separation and more accurate measurement of the desired isotope/s.

A second implementation of the invention will now be described. In this second implementation the processing component 11 comprises a Multi-Channel Analyser (MCA). The MCA records count rates in each of a multitude of energy channels and so allows detailed spectral data to be obtained. In use, the processing component 11 determines the energy spectrum from amplified pulse signals from the detector 4. Using the information from the temperature sensor 5 and the pressure sensor 6, changes to the spectral energy shift can be determined including peak position and peak shape. The processing component 11 uses the detailed data on the distribution of energy together with the extent of the predicted spectrum changes to extrapolate the remainder portions of each of the Radon curves, ie the broken line portions 20, 21 and 22 shown in FIG. 2 or at least the those portions of the curves which affect the Alpha activity region. This could be achieved by using appropriate curve-fitting techniques or other suitable methods. Accordingly the processing component 11 can determine an accurate measure of the degree of interference in the Alpha region from each of the Radon curves, and therefore an accurate value of the true Alpha activity can be obtained. If the determined Alpha activity level exceeds the predetermined threshold then a signal is issued to activate the alarm component 12.

In both of the above implementations it will be appreciated that a humidity sensor could also be employed to provide a measure of air density.

There are various important advantages to the above described embodiments. By achieving more accurate measurement of the desired isotope/s the occurrence of false alarms is reduced. Advantageously by continuously detecting changes in temperature and air pressure it is then possible to predict the resultant effect on the detected energy spectrum, and hence the degree of interference from unwanted isotopes.

Although specific reference has been made to a continuous air monitor (CAM) it will be appreciated that the invention could be used in other radioactivity measurement applications where the degree of interference from unwanted isotopes depends on the varying characteristics of the medium between a radioactive sample and the radiation detector.

It will be appreciated that although only one radioactivity detector is shown a plurality of radioactivity detectors may be provided.

Although in the above embodiments the pressure and temperature sensors are shown as local to the other components of the apparatus, in alternative embodiments it may be that pressure, temperature and/or humidity information is received from a remote source. In such embodiments the apparatus need not necessarily be provided with pressure, temperature or humidity sensor means.

The apparatus 1 may incorporate information display means which is adapted to visually display information relating to detected radioactivity. Such information display means may be provided in addition to or as an alternative to the alarm component 12.

It will be appreciated that the apparatus 1 may comprise means which is operative to determine or indicate the rate of air flow through the conduit as caused by the suction means 16. From such information radioactivity levels in required units, such as Becquerels, can be determined, and used or displayed appropriately.

It will be appreciated that application of the invention to a continuous air monitor is only one of numerous applications.

The invention claimed is:

1. Apparatus for at least one of detecting and measuring radioactivity comprising a sensor, a radiation detector and a signal processor, the sensor adapted to provide a measure of at least one characteristic of a medium between the radiation detector and a source of radioactivity, the arrangement being such that, in use, the signal processor is configured to compensate for varying degrees of interference from unwanted isotopes by taking into account information received from the sensor, and wherein the signal processor is configured to use the measure of the at least one characteristic provided by the sensor and measured radioactivity spectrum information provided by the radiation detector to produce modified radioactivity spectrum information, and wherein the signal processor extrapolates the modified radioactivity spectrum information to determine the interference of an unwanted isotope in a spectral region of interest.

2. Apparatus as claimed in claim 1 in which the sensor is configured to provide a measure of density of the medium.

3. Apparatus as claimed in claim 2 in which the sensor comprises a temperature sensor.

4. Apparatus as claimed in claim 2 in which the sensor comprises a pressure sensor.

5. Apparatus as claimed in claim 1 in which the sensor comprises a humidity sensor.

6. Apparatus as claimed in claim 1, wherein the signal processor is configured to use a process of energy spectrometry wherein the measured radioactivity spectrum information is modified.

7. Apparatus as claimed in claim 1 in which the signal processor is configured to use curve-fitting methodology to extrapolate the radioactivity data of the unwanted isotope.

8. Apparatus as claimed in claim 1 in which the signal processor is adapted to take signals from the sensor and to take said signals into account on a substantially real-time basis.

9. Apparatus as claimed in claim 1 in which the changes in the at least one characteristic of the medium are determined by means other than by measuring their effect on a resulting energy spectrum.

10. A method of enhancing at least one of detection and measurement of radioactivity by compensating for varying degrees of interference from unwanted isotopes due to changes in one or more characteristics of a medium between a source of radioactivity and a radiation detector, the method comprising:

using a sensor to obtain information and using the radiation detector to obtain radioactivity spectrum information, wherein information from the sensor relates to at least one characteristic of the medium, and said information is taken into account to achieve compensation, the method further comprising:

using a processor to modify the information from the sensor and measured radioactivity spectrum information from the radiation detector to produce modified radioactivity spectrum information, and extrapolating the modified radioactivity spectrum information to determine the interference of an unwanted isotope in a spectral region of interest.

* * * * *